(12) United States Patent
Dinger et al.

(10) Patent No.: US 8,856,342 B2
(45) Date of Patent: Oct. 7, 2014

(54) EFFICIENTLY RELATING ADJACENT MANAGEMENT APPLICATIONS MANAGING A SHARED INFRASTRUCTURE

(75) Inventors: John E. Dinger, Cary, NC (US); Matthew E. Duggan, Surrey (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/553,782

(22) Filed: Jul. 19, 2012

(65) Prior Publication Data

US 2013/0185418 A1  Jul. 18, 2013

Related U.S. Application Data

(63) Continuation of application No. 13/352,746, filed on Jan. 18, 2012.

(51) Int. Cl.
*G06F 15/173* (2006.01)

(52) U.S. Cl.
USPC .......................................... 709/226; 709/238

(58) Field of Classification Search
None
See application file for complete search history.

(56) References Cited

U.S. PATENT DOCUMENTS

| | | | |
|---|---|---|---|
| 7,725,559 B2 | 5/2010 | Landis et al. | |
| 7,958,095 B1 | 6/2011 | Campbell | |
| 2005/0254429 A1* | 11/2005 | Kato et al. | 370/238 |
| 2008/0120400 A1 | 5/2008 | Keller et al. | |
| 2008/0155100 A1* | 6/2008 | Ahmed et al. | 709/226 |
| 2008/0209005 A1 | 8/2008 | Akamatsu et al. | |
| 2009/0172666 A1 | 7/2009 | Yahalom et al. | |
| 2009/0313557 A1* | 12/2009 | Lewis et al. | 715/760 |
| 2010/0008230 A1* | 1/2010 | Khandekar et al. | 370/237 |
| 2010/0162259 A1 | 6/2010 | Koh et al. | |
| 2011/0099267 A1 | 4/2011 | Suri et al. | |
| 2011/0131252 A1* | 6/2011 | Son et al. | 707/803 |
| 2011/0202590 A1* | 8/2011 | Shin et al. | 709/202 |
| 2012/0163180 A1* | 6/2012 | Goel | 370/238 |
| 2013/0185435 A1 | 7/2013 | Dinger et al. | |

OTHER PUBLICATIONS

MPLS VPN Architecture and Terminology,[accessible online as of Nov. 17, 2011], accessed from http://mpls-configuration-on-cisco-ios-software.org.ua/1587051990/ch03lev1sec2.html, 2 pages.
MPLS VPN Routing Model, [accessible online as of Nov. 17, 2011], accessed from mpls-configuration-on-cisco-ios-software.org.ua/1587051990/ch03lev1sec3.html, 9 pages.

(Continued)

*Primary Examiner* — Oscar Louie
*Assistant Examiner* — Younes Naji
(74) *Attorney, Agent, or Firm* — John D. Flynn; Amy J. Pattillo

(57) ABSTRACT

A linkage controller analyzes, for a first management application managing at least one common resource with a second management application adjacent to the first management application within a computing environment comprising multiple resources and relationships, a resource and relationship model known by the first management application of a selection of resources and relationships managed by the first management application from among the plurality of resources and relationships in the computing environment. The linkage controller identifies, for the first management application, only a minimal set of resources and relationships within the resource and relationship model providing at least one optimal linkage point between the first management application and the second management application as to the at least one common resource. The linkage controller outputs the minimal set of resources and relationships to the second management application for relating to the first management application.

18 Claims, 7 Drawing Sheets

(56) References Cited

OTHER PUBLICATIONS

Gucer et al, Deployment Guide Series: IBM Tivoli Application Dependency Discovery Manager v7.1, ibm.com/redbooks, IBM Corporation, Aug. 2008, 472 pages.

Agarwal, et al, IBM Tivoli Change and Configuration Management Database (CCMDB) v 7.2.1 Implementation Guide, ibm.com/redbooks, IBM Corporation, Dec. 2010, 613 pages.

Nuangjamnong et al, The OSI Network Management Model—Capacity and performance management, Edith Cowan University Research Online, ECU Publications, 2008, 6 pages.

U.S. Appl. No. 13/352,746, filed Jan. 18, 2012, In re Dinger, International Business Machines Corporation, 51 pages.

Non-final Office Action, U.S. Appl. No. 13/352,746, filed Jan. 18, 2012, In re Dinger, International Business Machines Corporation, mailing date Aug. 16, 2013, 51 pages.

Final Office Action, U.S. Appl. No. 13/352,746, filed Mar. 11, 2014, In re Dinger, International Business Machines Corporation, mailing date Aug. 16, 2013, 87 pages.

Notice of Allowance, mailing date May 29, 2014, U.S. Appl. No. 13/352,746, filed Jan. 18, 2012, In re Dinger, International Business Machines Corporation, 100 pages.

* cited by examiner

EFFICIENTLY RELATING ADJACENT MANAGEMENT APPLICATIONS MANAGING A SHARED INFRASTRUCTURE

CROSS REFERENCE TO RELATED APPLICATIONS

This application is a continuation of commonly assigned U.S. patent application Ser. No. 13/352,746, filed Jan. 18, 2012, which is hereby incorporated herein by reference.

BACKGROUND

1. Technical Field

This invention relates in general to management applications managing a shared infrastructure in a computing environment and more particularly to efficiently relating adjacent management applications, of different disciplines, managing a shared infrastructure by identifying only the optimal resources and relationships between resources needed to build linkage between the management applications.

2. Description of the Related Art

In many complex computing environments, different teams will manage different disciplines of resources within the complex computing environment. For example, one team manages the server infrastructure, another team manages the application infrastructure, another team manages the storage infrastructure, and another team manages the network infrastructure, where servers, application, storage, and networks each represent a different discipline. Each management team manages a selection of resources using discipline-specific tools and management applications.

Within the complex computing environment, the different disciplines of resources are interrelated, therefore, effective management of adjacent disciplines requires establishing linkages between the teams and each team's management applications. In one example, a virtualized network switch that runs on a server is visible to both a server management application and an adjacent network management application, therefore for effective management of the visible virtualized network switch, a linkage identifying the virtualized network switch needs to be established between the server management application and the network management application.

BRIEF SUMMARY

In view of the foregoing, as the number of resources and complexity of relationships within a complex computing environment grows, there is a need for a method for efficiently relating adjacent management applications managing a shared infrastructure.

In one embodiment, a method for relating a first management application and an adjacent management application both managing at least one common resource in a computing environment, includes a step for analyzing, by a computer system, for a first management application managing at least one common resource with a second management application adjacent to the first management application within a computing environment including multiple resources and relationships, a resource and relationship model known by the first management application of a selection of resources and relationships managed by the first management application from among the multiple resources and relationships in the computing environment by identifying, for the first management application comprising a network management application, the at least one common resource comprising at least one virtualized network switch application, comprising a server management application, in a second resource and relationship model of a second selection of resources and relationships managed by the second management application from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure. The method comprises a step for identifying, by a computer system, for the first management application, only a minimal set of resources and relationships within the resource and relationship model providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application. The method comprises a step for outputting, by a computer system, the minimal set of resources and relationships to the second management application, such that the server management application is informed, within the minimal set of resources and relationships of at least one linkage resource within the first selection of resources and relationships that is not included in the second selection of resources and relationships managed by the second management application and is required to provide the at least one optimal linkage point between the network management application and the server management application through the at least one virtualized network switch.

In another embodiment, a system for relating a first management application and an adjacent management application both managing at least one common resource in a computing environment comprises a memory and a processor coupled to the memory. The system comprises a linkage controller operative, on the processor, to analyze for a first management application managing at least one common resource with a second management application adjacent to the first management application within a computing environment comprising plurality of resources and relationships, a resource and relationship model known by the first management application of a selection of resources and relationships managed by the first management application from among the plurality of resources and relationships by identifying, for the first management application comprising a network management application, the at least one common resource comprising at least one virtualized network switch operating at a layer of the computing environment also known by the second management application, comprising server management application, in a second resource and relationship model of a second selection of resources and relationships managed by the second management application from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure. The system comprises the linkage controller operative to identify, for the first management application, only a minimal set of resources and relationships within the resource and relationship model providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application. The system comprises the linkage controller operative to output the minimal set of resources and relationships to the second management application, such that the server management application is informed, within the minimal set of resources and relationships of at least one linkage resource within the first selection of resources and relationships that is not included in the second selection of resources and relationships managed by the second management application and is required to provide the at least one optimal linkage point between the network management application and the server management application through the at least one virtualized network switch.

In another embodiment, a computer program product for relating a first management application and an adjacent management application both managing at least one common resource in a computing environment is tangibly embodied in a non-transitory computer-readable storage medium. The computer program product includes computer executable instructions which cause a computer to analyze, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships by identifying, for the first management application comprising a network management application, the at least one common resource comprising at least one virtualized network switch operating at a layer of the computing environment also known by the second management application, comprising a server management application, in a second resource and relationship model of a second selection of resources and relationships managed by the second management application from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure. The computer program product includes computer executable instructions which cause a computer to identify, for the first management application, only a minimal set of resources and relationships within the resource and relationship model providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application. The computer program product includes computer executable instructions which cause a computer to output the minimal set of resources and relationships to the second management application such that the server management application is informed, within the minimal set of resources and relationships, of at least one linkage resource within the first selection of resources and relationships that is not included in the second selection of resources and relationships managed by the second management application and is required to provide the at least one optimal linkage point between the network management application and the server management application through the at least one virtualized network switch.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
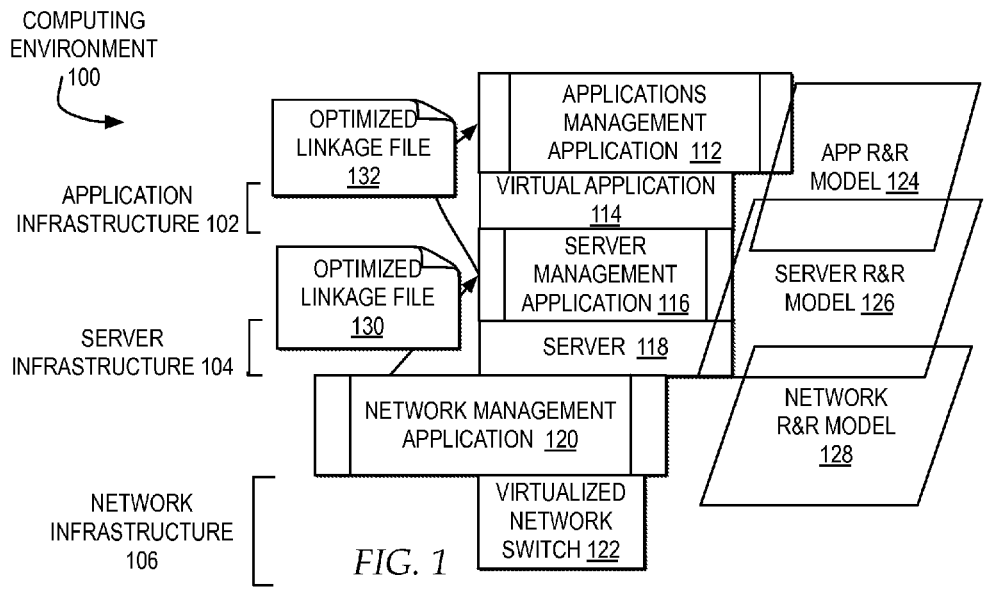
FIG. 1 is a block diagram illustrating one example of a computing infrastructure in which each management application determines a set of optimal resources and relationships for efficiently relating to adjacent management applications in a computing environment.

With reference now to the figures, and in particular with reference now to FIG. 1, a block diagram illustrates one example of a computing infrastructure in which each management application determines a set of optimal resources and relationships for efficiently relating to adjacent management applications in a computing environment.

In the example, a computing environment 100 may include multiple infrastructure layers, each focused on a separate discipline and each managed by one or more discipline-specific management applications. In the example, a network infrastructure 106, including a virtualized network switch 122, is managed by a network management application 120. Network management application 120 may include, but is not limited to, Tivoli® Network Manager, Computer Associates Spectrum® Infrastructure Manager, Hewlett Packard® Network Node Manager, Multi Router Traffic Grapher, VMware®, and Fiber Channel over Ethernet, and may include management for virtualized network switches, and other networking technologies. In addition, in the example, a server infrastructure 104, including a server 118, is managed by a server management application 116. Server management application 116 may include, but is not limited to, Tivoli® Monitoring, Tivoli® Monitoring for Virtualized Environments, Zabbix, and may include management of Operating Systems and middleware, such as Websphere® or DB2®, Hypervisors, and other server-resident functions. In addition, in the example, an application infrastructure 102, including a virtual application 114, is managed by an application management application 112. Applicants management application 112 may include, but is not limited to, Tivoli® Composite Application Manager, Hewlett Packard® Application Performance Management, Computer Associates Application Performance Management, or Helios® and may include management for virtual applications, composite applications, and traditional commercial applications.

In the example, server management application 116 is an adjacent application to each of network management application 120 and applications management application 112. In the example, while network management application 120 and applications management application 112 are not adjacent management applications, network management application 120 and applications management application 112 are associated with each other through the most optimal and consumable set of resources and relationships identified between adjacent applications for an application adjacent to both network management application 120 and applications management application 112, such as server management application 116. In the example, management disciplines that are not adjacent to one another, may still be associated through the most optimal and consumable set of resources and relationships determined for adjacent applications in each management discipline, providing an environment for linking adjacent and associated network, server/client, application, and storage management disciplines together.

In the example, one or more resources within network infrastructure are resources that are commonly managed by adjacent management applications. For example, virtualized network switch 122, which runs on server 118, is a resource, on Open Systems Interconnection (OSI) layer 2, commonly managed by both network management application 120 and server management application 116. In the example, while network infrastructure 106 is illustrated showing virtualized network switch 122 on OSI layer 2 as the resource commonly managed by network management application 102 and server management application 116, in other examples, network infrastructure 106, may include additional or alternate physical or virtualized network devices, including, but not limited to, switches, routers, firewalls, and load balancers, and one or more of the additional or alternate physical or virtualized network devices may be commonly managed by network management application 102 and server management application 116. In addition, as referred to herein, virtualized network switch 122 may represent additional or alternate physical or virtualized network devices including, but not limited to, switches, routers, firewalls, and load balancers. In the example, server 118, and other elements of server infrastructure 104 may represent one or more physical servers and one or more virtual servers, and may also represent one or more client systems. In addition, as referred to herein, server 118 may represent additional or alternate physical servers and virtual servers or one or more client systems.

In another example, virtual application 114, which runs on server 118, is a resource, on OSI layer 7, commonly managed by both server management application 116 and applications management application 112. In the example, while application infrastructure 102 is illustrated showing virtual application 114, on OSI layer 7, as the resource commonly managed by both server management application 116 and applications management application 112, in other examples, application infrastructure 102 may include additional or alternate applications or virtual applications and one or more of the additional or alternate applications may be commonly managed by server management application 116 and applications management application 112.

Because each management application manages one or more resources within computing environment 100, each management application has an awareness of at least a portion of the topology of computing environment 100 managed by the management application, but may not be aware of the entire topology of computing environment 100. The topology of computing environment 100 includes both the resources within computing environment 100 and the relationships between the resources. In the example, the portion of the topology of computing environment 100 known by network management application 120 is illustrated as network resource and relationship (R&R) model 128, the portion of the topology of computing environment 100 known by server management application 116 is illustrated as server R&R model 126, and the portion of the topology of computing environment 100 known by applications management application 112 is illustrated as application (app) R&R model 124. While computing environment 100 is illustrated with network management application 120, server management application 116, and applications management application 112, a computing environment may include management applications for additional or alternate areas including, but not limited to, storage management applications and security management applications.

Network R&R model 128 may include, for example, detailed information about the network resources and relationships between network resources managed in network infrastructure 106, but only basic information about the servers managed in server infrastructure 106, such as knowing which servers are connected to network switches in network infrastructure 106, and not any information about any of the applications in application infrastructure 102 that are running on servers in server infrastructure 106. Server R&R model 126 may include, for example, detailed information about the managed server resources and relationships between server resources in server infrastructure 104, but only basic information about the switches the servers are connected to in network infrastructure 106 and only basic information about the applications running on the servers and not any information about the routing and switching relationships in network infrastructure 106 nor any information about the business services provided by applications in application infrastructure 102. Application R&R model 124 may include, for example, detailed information about the managed applications running in application infrastructure 102, but only basic information about the managed servers on which application run in server infrastructure 104, and no information about network infrastructure 106.

In the example, because virtualized network switch 122 is commonly managed by management applications for different disciplines, which may further be managed by separate teams, to reconcile management of virtualized network switch 122, a linkage needs to be established as to virtualized network switch 122 between network management application 120 and server management application 116. In the example, network management application 120 analyzes the portion of the topology known to network management application 120 in network R&R model 128 and identifies a minimal set of resources and relationships from network R&R model 128 necessary to tie network management application 120 to server management application 116 for the commonly managed resource of virtualized network switch 122 at OSI layer 2. Network management application 120 outputs the identified set of resources and relationships in an optimized linkage file 130, where the identified set of resources and relationships represents the most optimal and consumable set of resources and relationships network management application 120 determines are required to link network management application 120 to server management application 116 as to virtualized network switch 122.

In addition, in the example, because virtual application 114 is commonly managed by management applications for different disciplines, to reconcile management of virtual application 114, a linkage needs to be established as to virtual application 114 between applications management application 112 and server management application 116. In the example, server management application 116 analyzes the portion of the topology known to server management application in server R&R model 126 and identifies a minimal set of resources and relationships from server R&R model 126 necessary to tie server management application 116 to applications management application 112 for the commonly managed resource of virtual application 114 at OSI layer 7. Server management application 116 outputs the identified minimal set of resources and relationships in an optimized linkage file 132, where the identified set of resources and relationships represents the most optimal and consumable set of resources and relationships server management application 116 determines are required to link server management application 116 to applications management application 112.

In the example, where network management application 120 is described as outputting optimized linkage file 130 and server management application 116 is described as outputting optimized linkage file 132, each with a most optimal and consumable set of resources and relationships, in other examples, network management application 120 and server management application 116 may output the most optimal and consumable set of resources and relationships by writing the optimized linkage file to disk or by exposing the most optimal and consumable set of resources and relationships through other mechanisms including, but not limited to application programming interfaces (APIs), multicasting, and database queries of tables containing the data.

In one example, the minimal set of resources and relationships, which represents the most optimal and consumable set of resources required to link adjacent management applications, is also the minimal intersect of resources required to link adjacent management applications. In particular, since each management application has a limited visibility of the entire topology of computing environment 100, when determining a minimal set of resources and relationships for linkage of management applications, a management application need only identify the necessary resources and relationships necessary to tie management disciplines together, rather than identifying all resources and relationships between two management applications. In one example, the most optimal and consumable resources are identified by management applications as a set of resources and relationships within the overlapping resources and relationships known in the resource and relationship models of adjacent management applications, which provide a path for linkage of the management applications. A set of resources and relationships is most consumable when only the resources and relationships required to form an appropriate linkage between management applications are included in the set of resources and relationships.

In one example, in determining the minimal set of resources and relationships necessary for linkage of management applications, as the set of resources and relationships identified by a management application shifts from the commonly known resources by the management application and an adjacent management application, to the resources from the management application discipline only, the value and consumability of the resources with respect to the linkage decreases. For example, if network management application 120 is determining the minimal set of resources and relationships for linkage to server 118 with respect to virtualized network switch 122, as network management application 120 moves from a starting device or seed device known in both server R&R model 126 and network R&R model 128, to a first level of switches or routers of the network discipline known by both application, and then to a second level of switches or routers, only known by network management application 120 in network R&R model 128, the value and consumability of the second level of switches and routers, as to the linkage determination, decreases.

In one example, in determining the minimal set of resources and relationships necessary for linkage of management application, a management application may adjust the starting point devices and the depth, or number of hops, taken within the known topology. By adjusting the starting point devices and number of hops, a management application may further direct and specify the selection of resources and relationships to identify as the minimal set of resources and relationships for linkage of the management application with an adjacent application. In one example, the starting devices may be set to include a particular type of device, such as a set of servers. In another example, the starting point devices may be set to include all devices with less than a configured number of connections. For example, the configured number of connections may be set to two connections.

In the example, while only a generalized topology of computing environment 100 is illustrated, even the minimal set of resources and relationships in optimized linkage files 130 and 132 may include a significant number of resources and relationships between resources. As the size of computing environment 100 scales up, the number of resources and relationships between resources increases and the need to efficiently determine the minimal set of resources and relationships for linking disparate management applications increases. By analyzing the portion of the topology of computing environment 100 already known to a management application to determine the minimal resources and relationships for linking to an adjacent management application, regardless of the size of computing environment 100, the management applications themselves efficiently determine the optimal selection of the most consumable resources and relationships that serve as a linkage point to adjacent management applications.

In contrast to the example illustrated in FIG. 1, a separate centralized management database may maintain resource and relationship information for computing environment 100 as a whole and provide a naming and reconciliation service for analyzing the resources and relationships in computing environment 100, identifying resources that are commonly managed by adjacent management applications, naming the commonly managed resource with a consistent identifier, and providing a subset of all the resources and relationships between management applications as to the commonly managed resource for relating management application. Each management application receiving the subset of all resources and relationships still has to determine, from the subset, a set of resources and relationships that form an appropriate linkage between the management applications. Maintaining a separate centralized management database with all the resource and relationship information for computing environment 100 and providing a naming and reconciliation service for providing linkage information to management applications may be efficient when computing environment 100 is a small computing environment, however, as the size of the environment increases, the resources required to maintain a management database and analyze the resources and relationships in the management database increase significantly. In addition, as the size of an environment increases, it may become impractical to store all the topology information about computing environment 100 is one management database. Further, to maintain a centralized management database, each management application still has to report the resource and relationship information known by each management application to the management database. Moreover, to maintain a centralized management database in a large computing environment, the detail of information stored about each resource may be limited. In addition, as to maintain a centralized management database, the time required for a management application to receive a subset of resources and relationships requires time and resources to send the request to and receive a response from the naming and reconciliation service and requires time and resources for the naming and reconciliation service to search the centralized management database.

In the example in FIG. 1, each management application uses the resources and relationship information already known by the management application to manage resources, in order to identify a minimal set of resources and relationships to link to an adjacent application managing a common resource, rather than having to report resource and relationship information to a centralized management database, query the centralized management database for a subset of all the resources and relationships between management application, and identify an appropriate linkage within the subset. In addition, in the example in FIG. 1, each management application determines the most optimal and consumable set of resources and relationships and includes set of resources and relationships in the optimized linkage with each resource and relationships described at the level of detail known by the management application managing the resources. Further, in the example in FIG. 1, each management application automates the identification of which resources and relationships are necessary to link the management application to an adjacent management application and provides flexibility in determining which types of resources and relationships to identify for reconciliation purposes.

Figure 2:
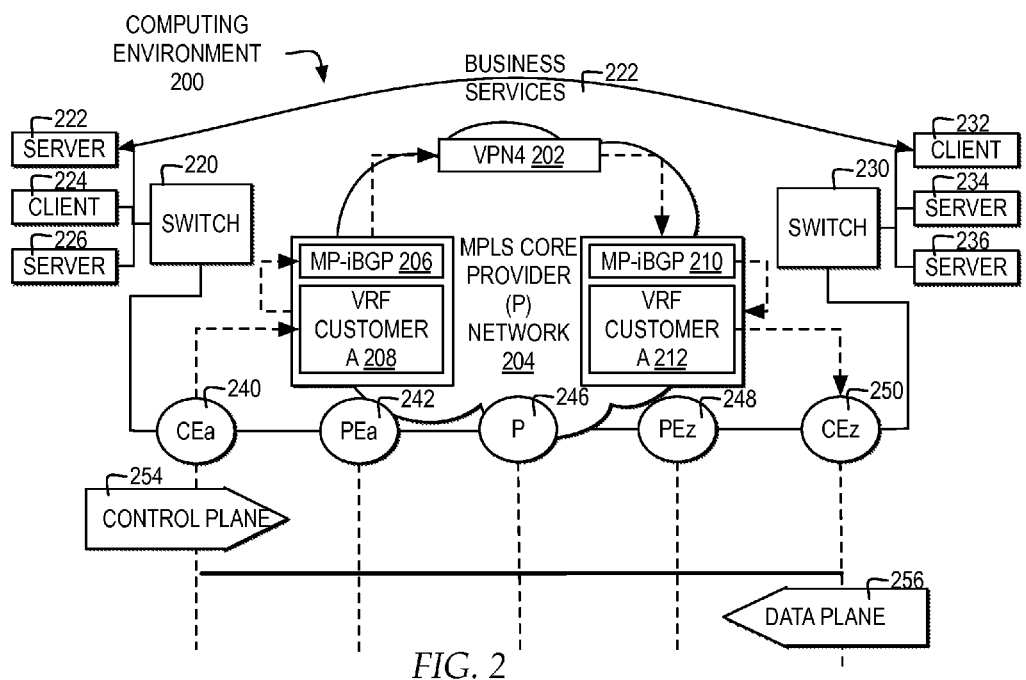
FIG. 2 is a block diagram illustrating one example of a complex computing environment for providing end-to-end business services supported by servers, applications, routers, switches, and routing protocols, in which one or more management applications manage one or more common resources.

With reference now to FIG. 2, a block diagram illustrates one example of a complex computing environment for providing end-to-end business services supported by clients and servers, applications, routers, switches, and routing protocols, in which one or more management applications manage one or more common resources. In the example, a computing environment 200 illustrates one example of a Multiprotocol Label Switching (MPLS) virtual private network, enabled by MPLS core provider network 204 and virtual private network (VPN) 4 202. In one example of a MPLS VPN, a provider network links one or more customer networks, where edge routers between networks carry customer routing information, providing optimal routing for traffic belonging to the customer for inter-site traffic.

In one example, computing environment 200 includes multiple resources and relationships within each infrastructure discipline, including a network infrastructure, a server infrastructure, and an application and business services infrastructure, and each discipline may be managed by a disparate management application. For example, a network infrastructure within computing environment 200 may include resources, protocols, and relationships including, but not limited to, switch 220, switch 230, MP-iBGP 206, Virtual Routing Table (VRF) customer A 208, MP-iBGP 210, VRF customer A 212, and routers labeled as CEa 222 and CEz 250 which are routers in a customer network that interface with the service provider network, routers PEa 242 and PEz 248, which are routers in the provider network that interface or connect to the customer edge routers in the customer network, and router P 246 which is the provider-controlled domain consisting of provider edge and provider core routers that connect sites belonging to the customer on a shared infrastructure, atop which control plane 254 and data plane 256 route data. In addition, for example, a server infrastructure within computing environment 200 may include resources and relationships including, but not limited to servers 222, 226, 234, and 236 and client systems 224 and 232. In addition, for example, an application and business service infrastructure within computing environment 200 may include business services 222.

In addition, computing environment 200 is further distinguished by a first customer environment that includes servers 222 and 226, client system 224, switch 220, and router CEa 240. In the example, a second customer environment in computing environment 200 includes switch 230, servers 234 and 236, client system 232, and router CEz 250.

Figure 3:
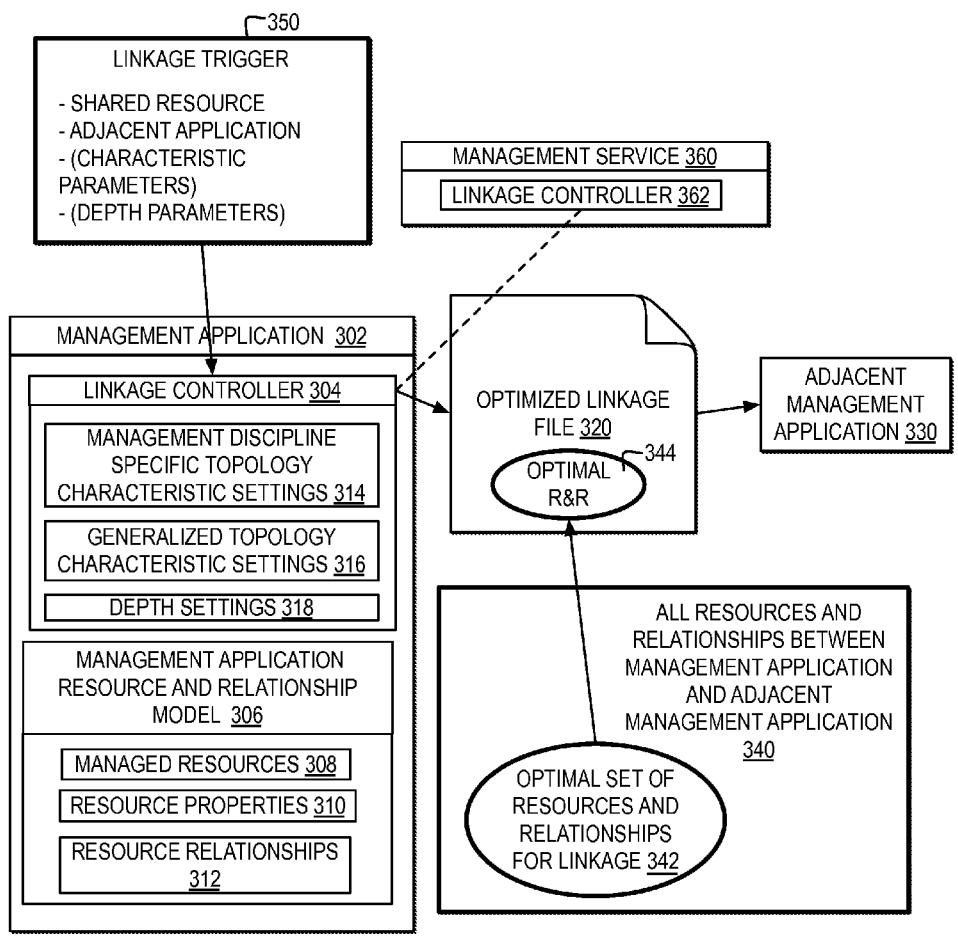
FIG. 3 is a block diagram illustrating one example of a management application for generating an optimized linkage file specifying a minimal set of resources and relationships necessary for linkage between one management application and an adjacent management application managing a shared resource.

In addition, computing environment may include resources that are commonly managed by adjacent management applications, where the adjacent management applications each primarily manage a particular discipline of resources. For example, Network Management Application 120 may manage physical networking components such as switches 220 and 230, logical networking constructs such as VPN4 202, attached server components such as servers 222, 226, 234, and 236, attached client components such as client systems 224 and 232, and virtual networking components, such as a vSwitch, that may exist in one or more of servers 222, 226, 234, or 236. In the example, server management application 116 may also manage the physical servers, such as servers 222, 226, 234, and 236, as well as hypervisor(s) and vSwitchs that may exist in servers 222, 226, 234, and 236, With reference now to FIG. 3, a block diagram illustrates one example of a management application for generating an optimized linkage file specifying a minimal set of resources and relationships necessary for linkage between one management application and an adjacent management application managing a shared resource.

As illustrated, a management application 302, such as network management application 120, server management application 116, or applications management application 112, includes a linkage controller 304. While linkage controller 304 is illustrated as a component of management application 302, as described herein, a linkage controller 362, operating through a management service 360 separate from management application 302, may access management application resource and relationship model 306 and also perform the functions described with respect to linkage controller 304, for management application 302.

In response to one or more types of inputs, linkage controller 304 is called for reconciling the identification of a shared resource by management application 302 and adjacent management application 330. Linkage controller 304 generates an optimized linkage file 320 including a most optimal and consumable set of resources and relationships for linkage between management application 302 and adjacent management application 330 as to the shared resource.

In one example, linkage controller 304 is triggered by an input, such as a linkage trigger 350, to trigger linkage controller 304 to generate optimized linkage file 320. In the example, linkage trigger 350 includes one or more parameters including, but not limited to, an identification of the shared resources, an identification of the adjacent application, a characteristic parameter for focusing the selection of optimal resources and relationships, and a depth parameter for limiting the depth of selection of optimal resources and relationships from starting point devices. In one example, the shared resource may further identify an OSI layer associated with the shared resource or linkage controller 304 may determine the OSI layer associated with the shared resource from model 306. In one example, the characteristic parameter may include a selection of a management discipline specific topology setting or a generalized topology setting and may include additional values for customizing the application of each type of topology setting. For example, for a generalized topology setting, a configurable number of connections to other devices may be set to a configured number. Management application 302 or another application or service may automatically generate linkage trigger 350. In addition, a user managing management application 302 may specify one or more of the parameters of linkage trigger 350.

In the example, linkage controller 304 analyzes a management application resource and relationship model 306, where management application resource and relationship model 306 represents the topological awareness of management application 302 of a topology of a computing environment based on the portion of the total resources and relationships within the computing environment that are managed by management application 302. In the example, management application resource and relationship model 306 may include one or more of managed resources 308 with information about the resources managed by management application 302, resource properties 310 with information about managed resources 308 and other resources within the computing environment, and resource relationships 312 with information about the connective relationships of managed resources 308 and other resources within the computing environment.

Linkage controller 304 analyzes area resource and relationship model 306 and identifies, from among all the resources and relationships between the management application and the adjacent management application, as illustrated at reference numeral 340, an optimal set of resources and relationships for linkage between the disparate management applications, as illustrated at reference numeral 342. Linkage controller 304 specifies the optimal set of resources and relationships for linkage, as illustrated at reference numeral 344, within optimized linkage file 320 and outputs optimized linkage file 320 to adjacent management application 330, or to a service that passes optimized linkage file 320 to adjacent management application 330. In the example, in addition to linkage controller 304 outputting the optimal set of resources and relationships in optimized linkage file 320 to another management application, linkage controller 304 may also write optimized linkage file 320 to disk or exposing the optimal set of resources and relationships to other management applications or other components through other mechanisms including, but not limited to application programming interfaces (APIs), multicasting, and database queries of tables containing the data.

In analyzing management application resource and relationship model 306, linkage controller 304 determines a starting point within model 306 and traverses the resources and relationships from the starting point based on a selected topology characteristic setting as further customized by any characteristic parameters in linkage trigger 350. In one example, if the characteristic parameter in linkage trigger 350 is set to the management discipline specific topology setting, then linkage controller 304 applies management discipline specific topology characteristic settings 314 in analyzing model 306, and if the characteristic parameter in linkage trigger 350 is set to the generalized topology setting, then linkage controller 304 applies generalized topology characteristics setting 316. If no characteristic parameter is set in linkage trigger 350, linkage controller 304 may select to apply one or both of management discipline specific topology characteristic settings 314 and generalized topology characteristic settings 316. In addition, the characteristic parameter in linkage trigger 350 may further specify one or more parameters, rules, or values to be applied in management discipline specific topology characteristic settings 314 or generalized topology characteristic settings 316, to further customize the selection of optimal resources and relationships within model 306 by linkage controller 304.

In one example, management discipline specific topology characteristic settings 314 specify how to determine a selection of resources as the starting point for determining the minimal set of resources and relationships, where the starting point is to include discipline specific resources from the management discipline of the adjacent management application that are the most optimal resources and relationships for linkage to the adjacent application, and how to traverse model 306 from the starting point from the most optimal resources and relationships toward suboptimal resources and relationships. In one example, management discipline specific topology characteristic settings 314 specify that the starting point should be set to a set of devices of the primary discipline of the adjacent management application, which are also known by the management application. For example, where the common resource known by a network management application and a server management application is an Ethernet network port and the associated OSI layer 2 network connectivity to the network port, under management discipline specific topology characteristic settings 314, linkage controller 302 specifies a starting point of a set of servers managed by the network management application and specifies an OSI layer to provide linkage through as OSI layer 2. In one example, linkage trigger 350 may further customize the analysis performed by linkage controller 304 by including a characteristic parameter that specifies the number of servers, a type of server, or specific set of servers to include in the set of servers as the starting point.

In one example, generalized topology characteristic settings 316 specify how to determine a selection of resources as a starting point for determining the minimal set of resources and relationships, where the starting point is to include resources and relationships meeting a defined topology characteristic that is generally associated with optimal resources and relationships for an adjacent application, and how to traverse model 306 from the starting point from the most optimal resources and relationships toward suboptimal resource and relationships. In the example, generalized topology characteristic settings 316 specify that the starting point should be set to a set of devices each having a number of connections to other devices that falls within a specified range. In general, certain types of devices within a topology of a computing environment are highly meshed, such as network devices, and other types of devices within a topology of a computing environment have few connections with other devices, such as servers. By setting the starting point to a set of devices with a number of connections within a range of two or fewer devices, the starting point will be set to mostly include servers, and by setting the starting point to a set of devices with a number of connections within a range of greater than two devices, the starting point will be set to mostly include network devices. For example, where the common resource known by a network management application and a server management application is the Ethernet network port and the associated OSI layer 2 network connectivity to the network port, under generalized topology characteristic settings 316, linkage controller 302 specifies a starting point of a set of devices within model 306 with two or fewer connections to other devices and specifies an OSI layer to provide linkage through as OSI layer 2. In one example, linkage trigger 350 may include a characteristic parameter that specifies the range to be applied for determining the devices to include in the start point or that specifies the set of devices to include in the set of devices as the starting point.

In analyzing management application resource and relationship model 306, linkage controller 304 traverses the resources and relationships from the starting point, towards suboptimal resources and relationships, as limited by depth settings 318, and any additional depth parameters specified in linkage trigger 350. In one example, depth settings specify the number of additional hops to allow from optimal resources and relationships towards suboptimal resources and relationships, where within the topology of the computing environment, resources directly linked to one another are one hop away from one another. In one example, depth settings 318 may specify conditions upon which to allow for additional hops and may further specify the types of devices to allow hops to. In another example, depth settings 318 may be further customized by depth parameters in linkage trigger 350, where depth parameters may specify a number of additional hops, restrict any additional hops, define conditions for allowing additional hops, or identify a type of device to include an any additional hop.

Figure 4:
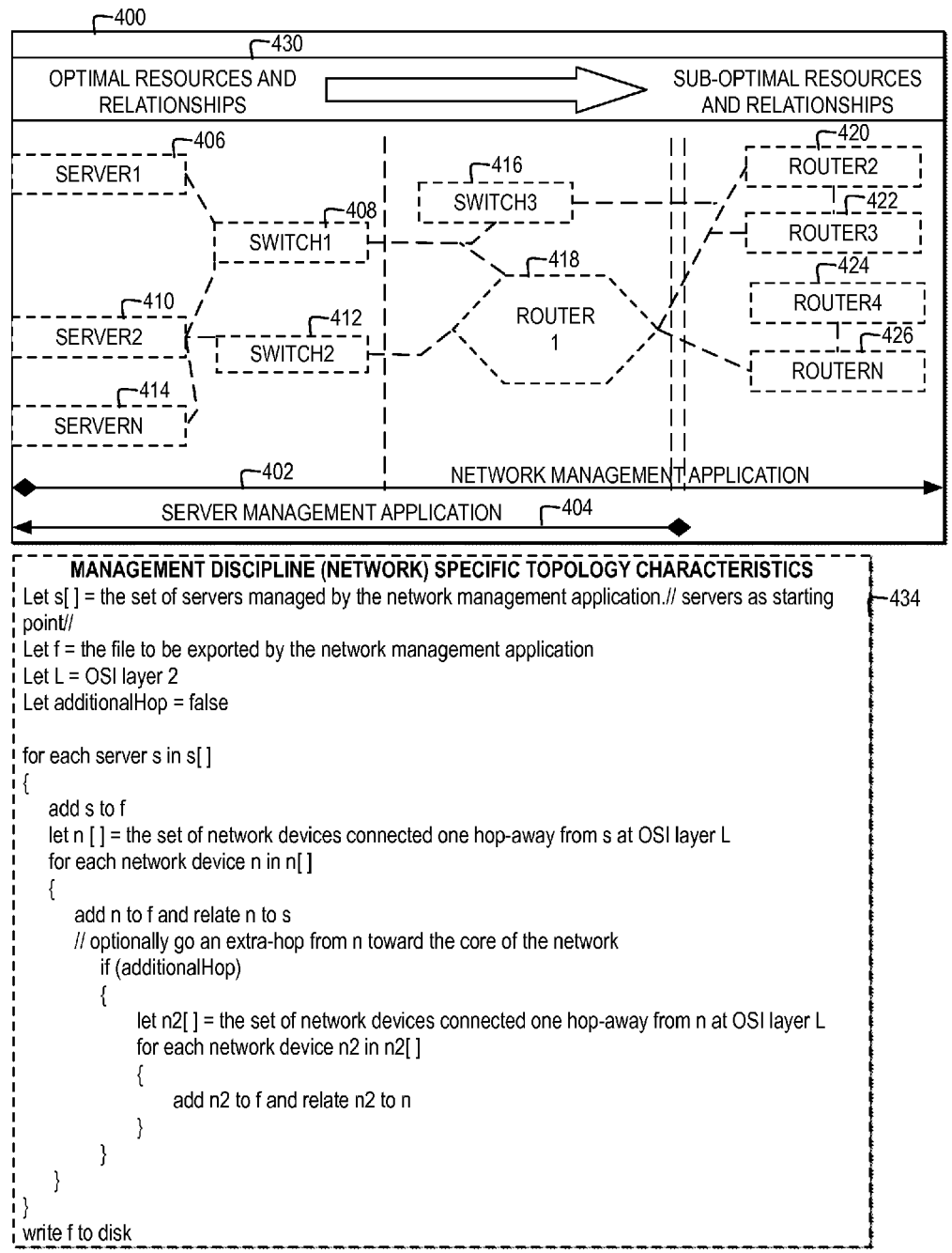
FIG. 4 is a block diagram illustrating one example of a management discipline specific topology characteristic based determination of an optimal set of resources and relationships for linkage of a network management application with an adjacent server management application, where the management applications share a virtualized network switch at OSI layer 2.

With reference now to FIG. 4, a block diagram illustrates one example of a management discipline specific topology characteristic based determination of an optimal set of resources and relationships for linkage of a network management application with an adjacent server management application, where the management applications share a virtualized network switch at OSI layer 2. In the example, a network management application 402 determines an optimal set of resources and relationships for linkage of network management application 402 with an adjacent server management application 404.

In the example, a network resource and relationship model 400 is illustrated reflecting the ordering of resources and relationships applied under management discipline specific topology characteristic settings 314 specified for a network management application. In model 400, according to management discipline specific topology characteristic settings 314, the starting point for the optimal linkage determination is set to one or more servers, which are the managed resource most optimal to adjacent server management application 404. As illustrated at reference numeral 430, in model 400 as the set of managed resources used by network management application 402 to try to link to adjacent server management application 404 increases towards resources primarily of the management discipline of network management application 402, consumability and value with respect to integration decreases.

In particular, in the example, for network management application 402 to determine the optimal resources and relationships for linkage to server management application 404, the starting point for the optimal linkage determination is set to a set of servers managed by network management application 402, such as server1 406, server2 410, and serverN 414. A linkage controller of network management application 402 traverses a path from the starting point of the most optimal resources and relationships, towards the sub-optimal resources and relationships, only to a depth allowed and necessary to determine the minimum resources and relationships required for linkage of network management application 402 to server management application 404. In the example, linkage controller 304 of network management application 402 determines the number of additional hops to allow from the optimal resources and relationships of the managed servers, to the suboptimal levels of the network infrastructure, from a first layer of switch1 408 and switch2 412, to a next hop to switch3 416 and router1 418, to an additional hop toward the core of the network to router2 420, router3 422, router4 424, and router N 426. In the example, although the managed resources between network management application 402 and server management application 404 may include switch 3 416, router1 418, router2 420, router3 422, router4 424, and routerN 426, an optimal set of resources and relationships for linkage of network management application 402 to server management application 404 would not include router2 420, router3 422, router4 424, or routerN 426 and, would not include switch3 416 or router1 418 unless an option is set to include the middle hop devices.

In one example, management discipline specific topology code 434 illustrates one example of one or more elements to be performed by a linkage controller of network management application 402 to determine an optimal set of resources and relationships for linkage to server management application 404 for a shared resource at OSI layer 2. In the example, code 434 defines a set of servers managed by network management application 402 as the starting point (let s[ ]=the set of servers managed by the network management application), defines a file to be exported by the network management application (let f=the file to be exported by the network management application), defines an OSI layer to be traversed (let L=OSI layer 2), and sets an "additionalHop" variable to specify whether to traverse an additional hop toward the core of the network (let additionalHop=false). In the example, code 434 commands that for each server in the set of servers (for each server s in s[ ]), the server information is added to the file (add s to f) and defines a set of network devices one hop-away from the server at the defined OSI layer (let n [ ]=the set of network devices connected one hop-away from s at OSI layer L). Next, in the example, code 434 commands that for each network device in the set of network devices (for each network device n in n[ ]), the network device is added to the file and related to the server (add n to f and relate n to s). In the example, code 434 commands that if additionalHop is set to true, then a second set of network devices is defined that are one hop-away from the network device at the defined OSI layer (let n2[ ]=the set of network devices connected 1 hop-away from n at OSI layer L) and for each of the network devices in the second set, the network device in the second set is added to the file and related to the network device in the first set of network devices (for each network device n2 in n2[ ], add n2 to f and relate n2 to n). Finally, code 434 commands to write the optimized file to disk (write f to disk).

In the example, as code 434 is applied to model 400, where additionalHop is set to false, only server1 406, server 2 410, server N 414, switch1 408, and switch 2 412, and the relationships between these resources, may be among the selection of resources and relationships included in the file. In another example, as code 434 is applied to model 400, if additionalHop is set to true, an additional hop toward the core of the network may add switch3 416 and router 1 418 and the relationships to switch3 416 and router1 418 as the second set of network devices written to the file.

Figure 5:
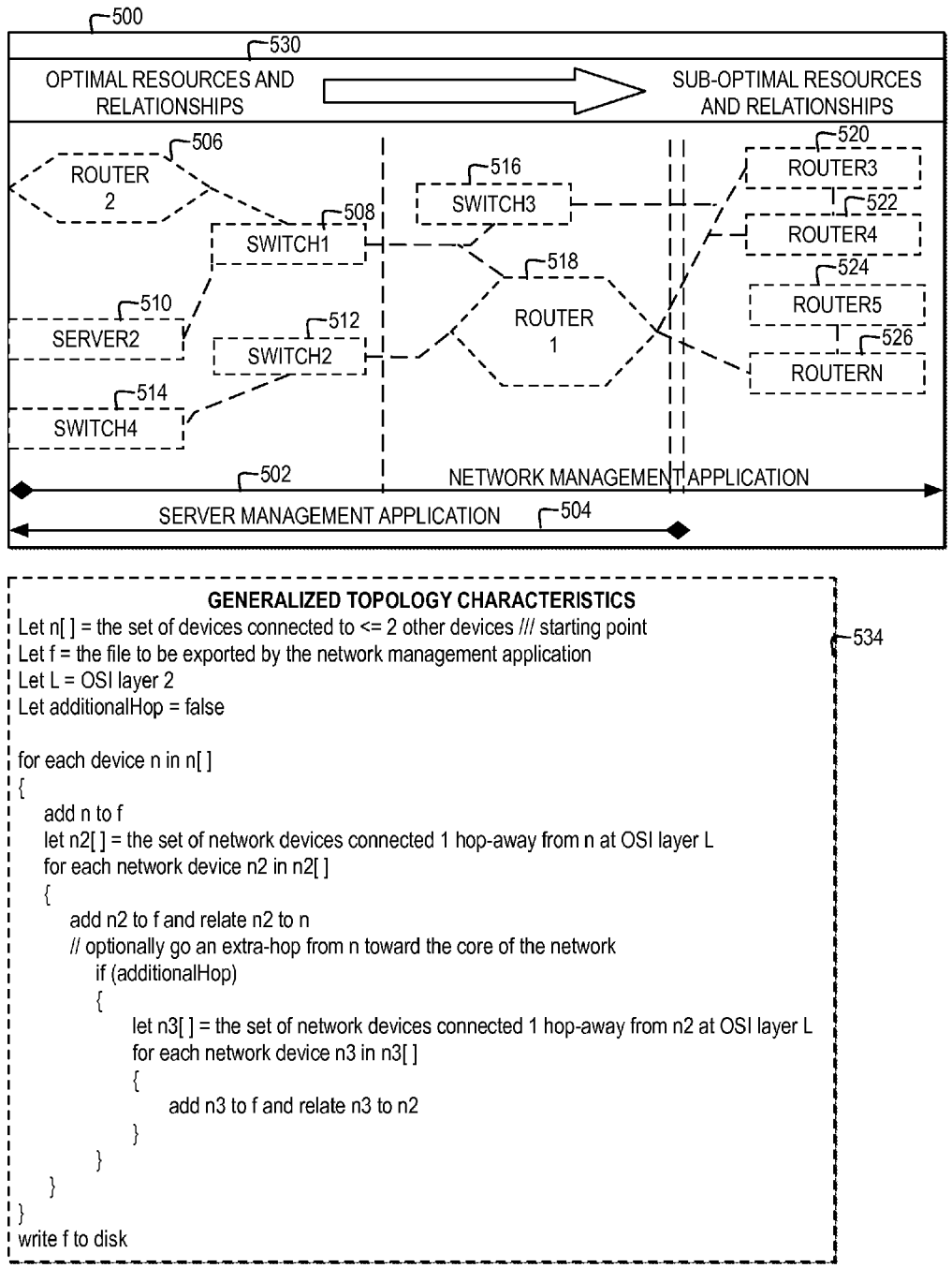
FIG. 5 is a block diagram illustrating one example of a generalized topology characteristic based determination of an optimal set of resources and relationships for linkage of a network management application with an adjacent server management application, where the management applications share a virtualized network switch at OSI layer 2.

With reference now to FIG. 5, a block diagram illustrates one example of a generalized topology characteristic based determination of an optimal set of resources and relationships for linkage of a network management application with an adjacent server management application, where the management applications share a virtualized network switch at OSI layer 2. In the example, a network management application 502 determines an optimal set of resources and relationships for linkage of network management application 502 with an adjacent server management application 504.

In the example, a network resource and relationship model 500 is illustrated reflecting the ordering of resources and relationships applied under generalized topology characteristic settings 316 specified for a network management application. In model 500, according to generalized topology characteristic settings 316, the starting point for the optimal linkage determination is set to one or more devices connected to less than a configured number of other devices, which are the managed resource most optimal to adjacent server management application 504. As illustrated at reference numeral 530, in model 500 as the set of managed resources used by network management application 502 to try to link to adjacent server management application 504 increases towards resources with a greater number of connections with other resources or towards resources that are only known by network management application 502, consumability and value with respect to integration decreases.

In particular, in the example, for network management application 502 to determine the optimal resources and relationships for linkage to server management application 504, the starting point for the optimal linkage determination is set to a set of devices managed by network management application 502 and connected to less than a configured number of other devices, where the configured number is set to two. In the example, by setting the configured number to two, only those devices with only one connection are included as starting point devices, where devices with only one connection may include devices on the edge of a network. In one example, by setting the configured number of devices to a higher number, such as three, in a highly redundant environment, devices with less than three connections may include devices that are on the edge of shared resources, such as a server with multiple network interface cards.

A linkage controller of network management application 502 traverses a path from the starting point of the most optimal resources and relationships, towards the sub-optimal resources and relationships, only to a depth allowed and necessary to determine the minimum resources and relationships required for linkage of network management application 502 to server management application 504. In the example, linkage controller 304 of network management application 502 determines the number of additional hops to allow from the optimal resources and relationships of router2 506, server2 510, and switch4 514, the devices, of any type, connected to fewer than two other devices, to the suboptimal levels of the network infrastructure, from a first layer of switch1 508 and switch2 512, to a next hop to switch3 516 and router1 518, to an additional hop toward the core of the network to router3 520, router4 522, router5 524, and router N 526. In the example, although the managed resources between network management application 502 and server management application 504 may include switch3 516, router1 518, router2 520, router3 522, router4 524, and routerN 526, an optimal set of resources and relationships for linkage of network management application 502 to server management application 504 would not include router2 520, router3 522, router4 524, or routerN 526, and would not include switch3 516 or router1 518 unless an option is set to include the middle hop devices.

In one example, generalized topology characteristics code 534 illustrates one example of one or more elements to be performed by a linkage controller of network management application 502 to determine an optimal set of resources and relationships for linkage to server management application 504 for a shared resource at OSI layer 2. In the example, code 534 defines a set of devices connected to less than two other devices, managed by network management application 502 as the starting point (let n[ ]=the set of devices connected to <=2 other devices), defines a file to be exported by the network management application (let f=the file to be exported by the network management application), defines an OSI layer to be traversed (let L=OSI layer 2), and sets an "additionalHop" variable to specify whether to traverse an additional hop toward the core of the network (let additionalHop=false). In the example, code 534 commands that for each device in the set of devices (for each device n in n[ ]), the device information is added to the file (add n to f) and defines a second set of network devices one hop-away from the first set of devices at the defined OSI layer (let n2 [ ]=the set of network devices connected one hop-away from n at OSI layer L). Next, in the example, code 534 commands that for each network device in the second set of network devices (for each network device n2 in n2[ ]), the network device is added to the file and related to the network device in the first set of network devices (add n2 to f and relate n2 to n). In the example, code 534 commands that if additionalHop is set to true, then a third set of network devices is defined that are one hop-away from the network device in the second set of network devices at the defined OSI layer (let n3[ ]=the set of network devices connected 1 hop-away from n2 at OSI layer L) and for each of the network devices in the third set, the network device in the third set is added to the file and related to the network device in the second set of network devices (for each network device n3 in n3[ ], add n3 to f and relate n3 to n2). Finally, code 534 commands to write the optimized file to disk (write f to disk).

In the example, as code 534 is applied to model 500, where additionalHop is set to false, only router2 506, switch 1 508, switch4 514, and switch2 512, and the relationships between these resources, may be among the selection of resources and relationships included in the file. In another example, as code 534 is applied to model 500, if additionalHop is set to true, an additional hop toward the core of the network may add switch3 516 and router1 518 and the relationships to switch3 516 and router1 518 as the second set of network devices written to the file.

Figure 6:
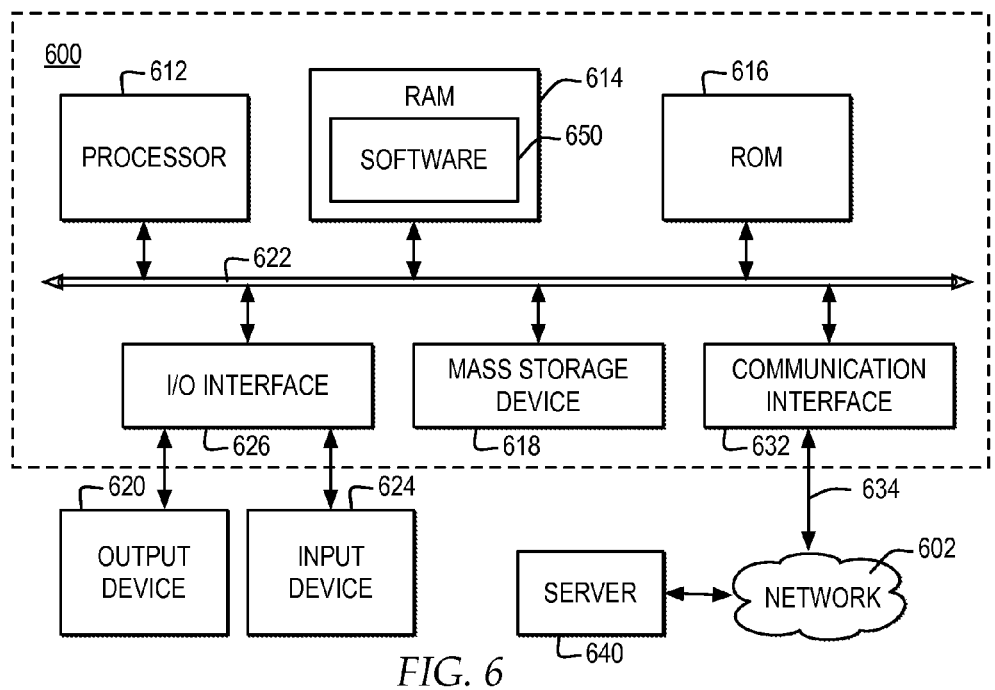
FIG. 6 is one example illustrating a schematic of a computer system in which the present invention may be implemented.

FIG. 6 illustrates one example of a schematic of a computer system in which the present invention may be implemented. The present invention may be performed in a variety of systems and combinations of systems, made up of functional components, such as the functional components described with reference to computer system 600 and may be communicatively connected to a network, such as network 602. In one example, application infrastructure 102, server infrastructure 104, and network infrastructure 106, may each implement one or more instances of functional components of computer system 600. In another example, computer system 600 may represent one or more cloud computing nodes.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network-servicing power. Where multiple processors share bus 622, additional controllers (not depicted) for managing bus access and locks may be implemented.

Processor 612 may be at least one general-purpose processor such as IBM® PowerPC® (IBM and PowerPC are registered trademarks of International Business Machines Corporation) processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650, including operating system and application software, may include, but is not limited to, code, applications, protocols, interfaces, and processes for controlling one or more systems.

Figure 7:
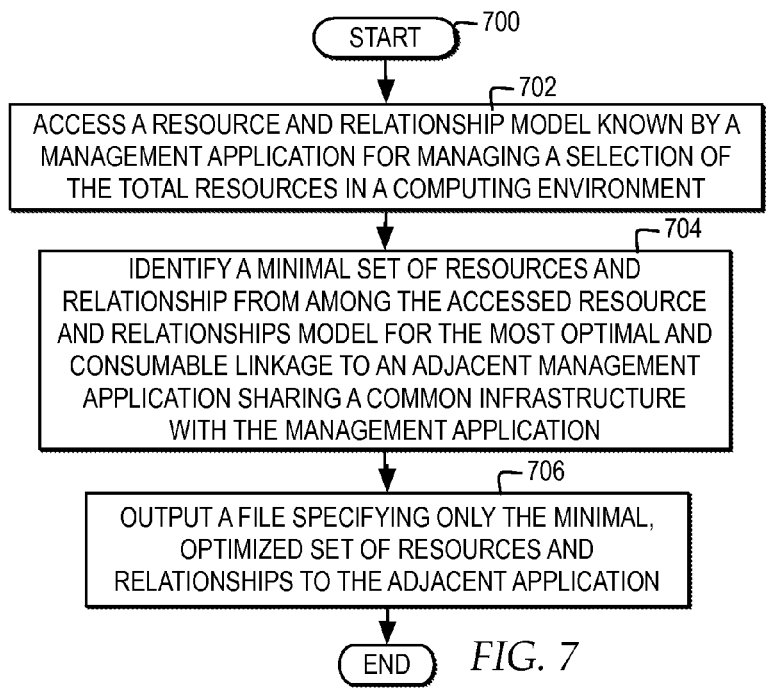
FIG. 7 is a high-level logic flowchart illustrating a process and program for a management application providing an adjacent management application, managing at least one common resource, an optimal set of resources and relationships for linkage of the management applications as to the at least one common resource.
Figure 8:
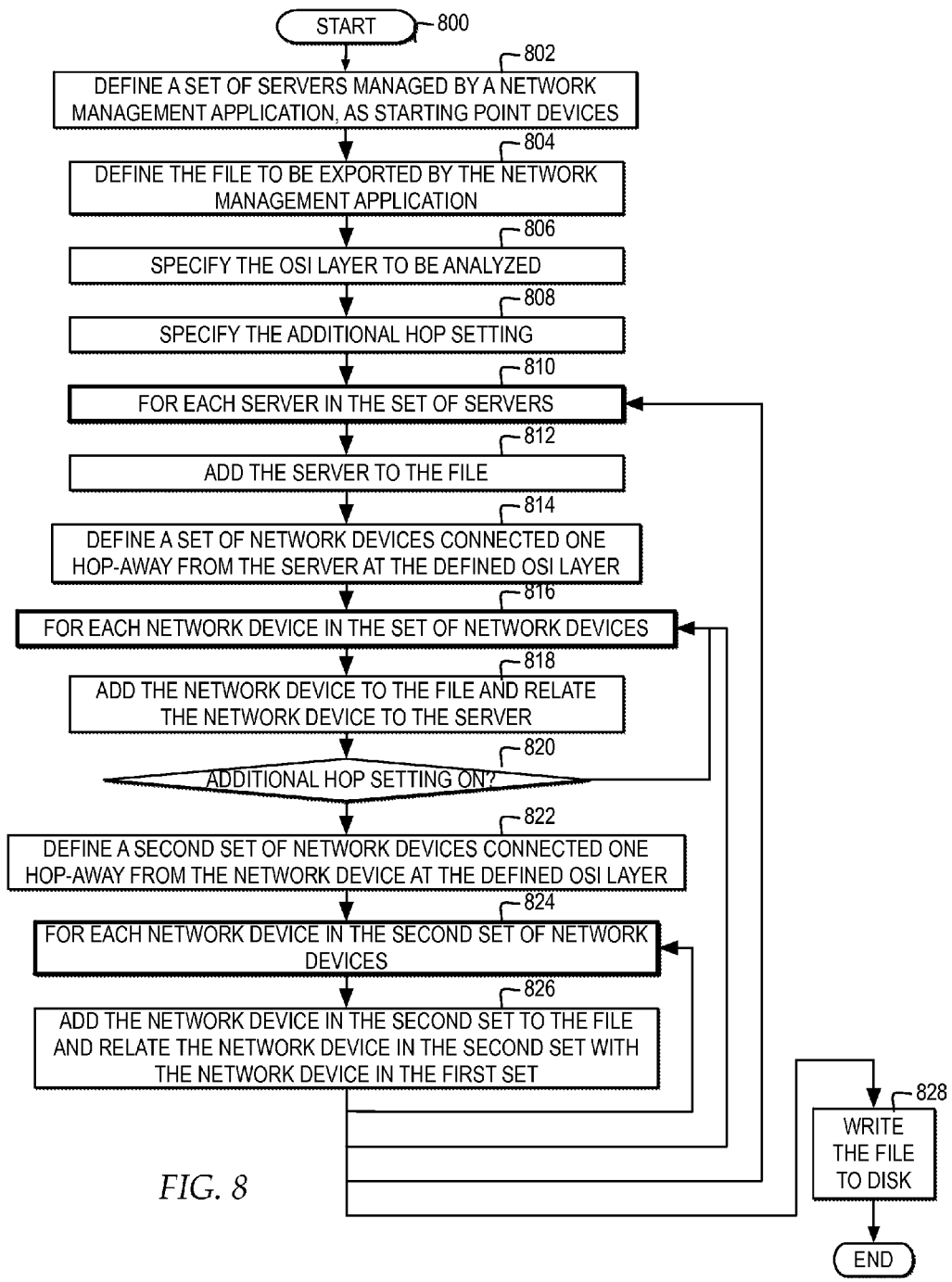
FIG. 8 is a high-level logic flowchart illustrating a process and program for a management application determining an optimal set of resources and relationships for linkage to an adjacent application that manages a commonly shared resource in a computing environment, based on a management discipline specific topology of a portion of the computing environment.
Figure 9:
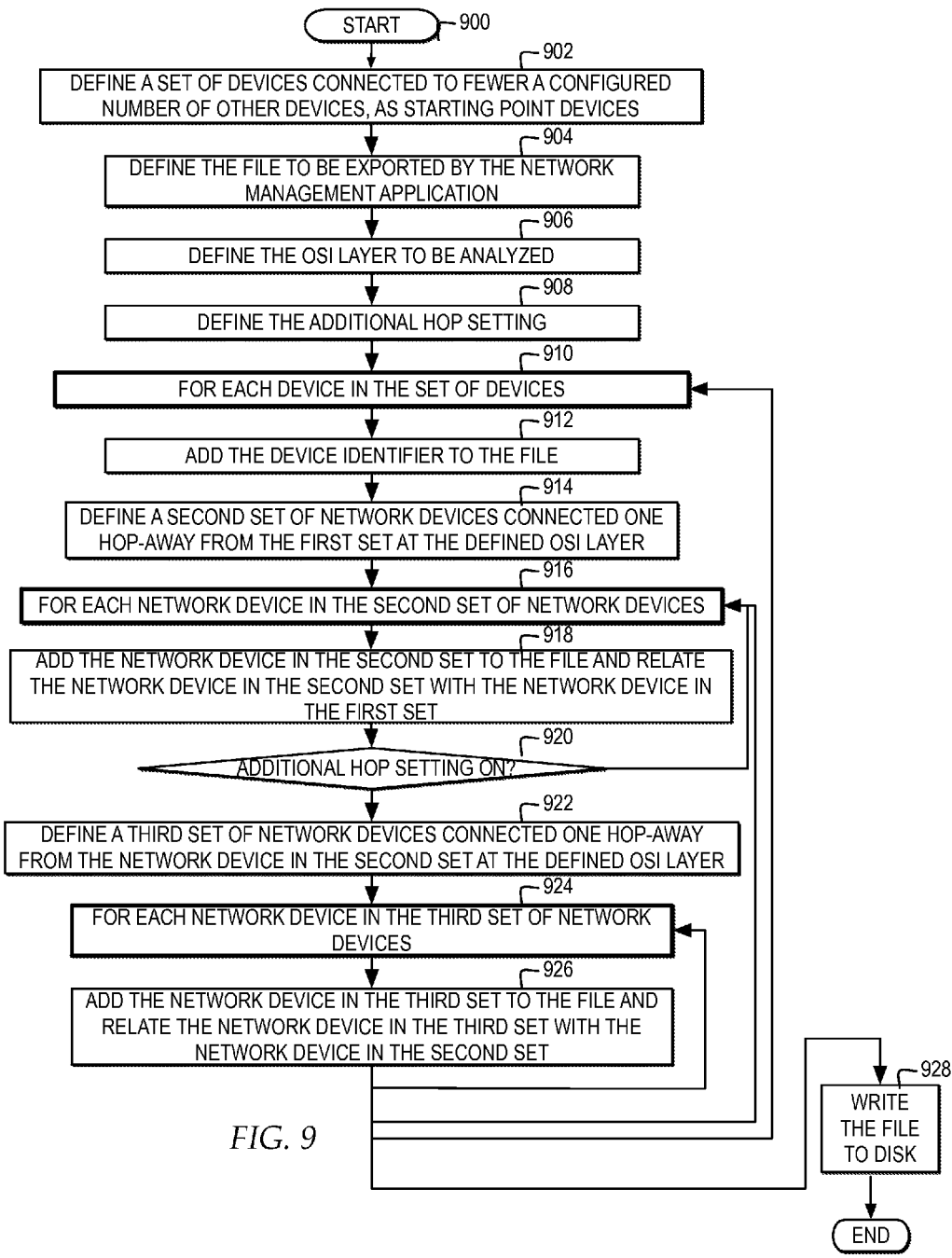
FIG. 9 is a high-level logic flowchart illustrating a process and program for a management application determining an optimal set of resources and relationships for linkage to an adjacent application that manages a commonly shared resource in a computing environment, based on generalized topology characteristics of a portion of the computing environment.

In one embodiment, the operations performed by processor 612 may control the operations of flowchart of FIGS. 7, 8, and 9 and other operations described herein. Operations performed by processor 612 may be requested by software, such as operating system and application software, or other code or the steps of one embodiment of the invention might be performed by specific hardware components that contain hard-wired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 618, a random access memory (RAM), such as RAM 614, a read-only memory (ROM) 616, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wire line, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 600, partly on the user's computer, as a stand-alone software package, partly on the user's computer and partly on a remote computer or entirely on the remote computer or server, such as server 640. In the latter scenario, the remote computer may be connected to the user's computer through any type of network, such as network 602, through a communication interface, such as network interface 632, over a network link that may be connected, for example, to network 602.

In the example, network interface 632 includes an adapter 634 for connecting computer system 600 to network 602 through a link. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients or servers via multiple separate ports and each port may also support multiple connections to multiple clients or multiple servers.

One embodiment of the invention is described herein with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 600, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 600, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 632, the network link to network 602, and network 602 may use electrical, electromagnetic, or optical signals that carry digital data streams. The signals through the various networks and the signals on network 602, the network link to network 602, and network interface 632 which carry the digital data to and from computer system 600, may be forms of carrier waves transporting the information.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

With reference now to FIG. 7, a high-level logic flowchart illustrates a process and program for a management application providing an adjacent management application, managing at least one common resource, an optimal set of resources and relationships for linkage of the management applications as to the at least one common resource. In the example, the process starts at block 700 and thereafter proceeds to block 702. Block 702 illustrates accessing a resource and relationship model known by a management application for managing a selection of the total resources in a computing environment. Next, block 704 depicts identifying a minimal set of resources and relationships from among the accessed resource and relationships model for the most optimal and consumable linkage to an adjacent management application sharing a common infrastructure with the management application. Thereafter, block 706 illustrates outputting a file to the adjacent application specifying only the minimal, optimized set of resources and relationships, and the process ends.

Referring now to FIG. 8, a high-level logic flowchart illustrates a process and program for a management application determining an optimal set of resources and relationships for linkage to an adjacent application that manages a commonly shared resource in a computing environment, based on a management discipline specific topology of a portion of the computing environment. In the example, the process starts at block 800 and thereafter proceeds to block 802.

Block 802 illustrates defining a set of servers managed by a network management application, as starting point devices. In one example, as illustrated in FIG. 4, a network management application may manage one or more servers, such as Server1 406 or server2 410, connected to one or more network devices managed by the network, such as switch 1 408 or switch2 412. Next, block 804 illustrates defining the file to be exported by the network management application. Thereafter, block 806 illustrates defining the OSI layer to be analyzed. Next, block 808 illustrates defining the additional hop setting, and the process passes to block 810.

Block 810 illustrates, for each server in the set of servers, performing the steps following block 810. Block 812 depicts adding the server information to the file. Next, block 814 illustrates defining a set of network devices connected one hop-away from the server at the defined OSI layer, and the process passes to block 816.

Block 816 illustrates, for each network device in the set of network devices, performing the steps following block 816. Block 818 illustrates adding the network device information to the file and relating the network device to the server identified in block 812. Next, block 820 illustrates a determination whether an additional hop setting is on. If the additional hop setting is not on, then the process returns to block 816 and continues to perform the steps following block 816 for each network device in the set of network devices, and then the process returns to block 810 and continues to perform the steps following block 810 for each server in the set of servers. If the additional hop setting is on, then the process passes to block 822. Block 822 illustrates defining a second set of network devices connected one hop-away from the network device at the defined OSI layer, and the process passes to block 824.

Block 824 illustrates, for each network device in the second set of network devices, performing the step following block 824. Block 826 illustrates adding the network device in the second set of network devices to the file and relating the network device in the second set of network devices to the network device in the first set of network devices identified in block 818, and the process returns to block 824 and continues to perform the steps following block 824 for each network device in the second set of network devices, then returns to block 816 and continues to perform the steps following block 816 for each network device in the first set of network devices, and then returns to block 810 and continues to perform the steps following block 810 for each server in the set of servers.

When the steps following block 810, block 816, and block 824, if the additional hop setting is on, have been performed, the process passes to block 828. Block 828 illustrates writing the file to disk, and the process ends.

Referring now to FIG. 9, a high-level logic flowchart illustrates a process and program for a management application determining an optimal set of resources and relationships for linkage to an adjacent application that manages a commonly shared resource in a computing environment, based on generalized topology characteristics of a portion of the computing environment. In the example, the process starts at block 900 and thereafter proceeds to block 902.

Block 902 illustrates defining a set of devices managed by a network management application, which are connected to less than a configured number of other devices, such as less than two other devices, as starting point devices. Next, block 904 illustrates defining the file to be exported by the network management application. Thereafter, block 906 illustrates defining the OSI layer to be analyzed. Next, block 908 illustrates defining the additional hop setting, and the process passes to block 910.

Block 910 illustrates, for each device in the set of devices, performing the steps following block 910. Block 912 depicts adding the device information to the file. Next, block 914 illustrates defining a second set of network devices connected one hop-away from the first set of devices at the defined OSI layer, and the process passes to block 916.

Block 916 illustrates, for each network device in the second set of network devices, performing the steps following block 916. Block 918 illustrates adding the network device information to the file and relating the network device from the second set of network devices to the network device from the first set of network devices identified in block 912. Next, block 920 illustrates a determination whether an additional hop setting is on. If the additional hop setting is not on, then the process returns to block 916 and continues to perform the steps following block 916 for each network device in the second set of network devices, and then the process returns to block 910 and continues to perform the steps following block 910 for each network device in the set of network devices. If the additional hop setting is on, then the process passes to block 922. Block 922 illustrates defining a third set of network devices connected one hop-away from the network device of the second set of network devices at the defined OSI layer, and the process passes to block 924.

Block 924 illustrates, for each network device in the third set of network devices, performing the step following block 924. Block 926 illustrates adding the network device in the third set of network devices to the file and relating the network device in the third set of network devices to the network device in the second set of network devices identified in block 918, and the process returns to block 924 and continues to perform the steps following block 924 for each network device in the third set of network devices, then returns to block 916 and continues to perform the steps following block 916 for each network device in the second set of network devices, and then returns to block 910 and continues to perform the steps following block 910 for each network device in the first set of network devices.

When the steps following block 910, block 916, and block 924, if the additional hop setting is on, have been performed, the process passes to block 928. Block 928 illustrates writing the file to disk, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for relating a first management application and an adjacent management application both managing at least one common resource in a computing environment, comprising:

analyzing, by a computer system, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships by identifying, for the first management application comprising a network management application, the at least one common resource comprising at least one virtualized network switch operating at a layer of the computing environment also known by the second management application, comprising a server management application, in a second resource and relationship model of a second selection of resources and relationships managed by the second management application, from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure;

identifying, by the computer system, for the first management application, only a minimal set of resources and relationships within the resource and relationship model required for providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application; and outputting, by the computer system, the minimal set of resources and relationships to the second management application, such that the server management application is informed, within the minimal set of resources and relationships, of at least one linkage resource within the first selection of resources and relationships that is not included in the second selection of resources and relationships managed by the second management application and is required to provide the at least one optimal linkage point between the network management application and the server management application through the at least one virtualized network switch.

2. The method according to claim 1, wherein analyzing, by the computer system, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships further comprises:

identifying, by the computer system, for the first management application comprising the server management application, the at least one common resource operating at the layer of the computing environment also known by the second management application comprising the application management application in the second resource and relationship model of the second selection of resources and relationships managed by the second management application from among the plurality of resources and relationships, wherein the server management application primarily manages the server infrastructure in the computing environment in a layer adjacent to an application infrastructure in the computing environment, wherein the application management application primarily manages the application infrastructure.

3. The method according to claim 1, wherein identifying, by the computer system, for the first management application, only a minimal set of resources and relationships within the resource and relationship model providing at least one optimal linkage point between the first management application and the second management application further comprises:

identifying, by the computer system, for the first management application, a starting point of a set of devices providing an optimal and consumable set of devices for the minimal set of resources and relationships; and identifying, by the computer system, for the first management application, a next layer of devices for the minimal set of resources and relationships, wherein the next layer of devices are connected to the set of devices and one hop away from the set of devices toward a type of device primarily managed by the first management application in a topology within the resource and relationship model.

4. The method according to claim 3, further comprising:

responsive to a depth setting allowing for an additional layer of depth, identifying, by the computer system, for the first management application, an additional layer of devices for the minimal set of resources and relationships, wherein the additional layer of devices are connected to the next layer of devices and one hop away from the next layer of devices toward the type of device primarily managed by the first management application in the topology within the resource and relationship model.

5. The method according to claim 3, wherein identifying, by the computer system, for the first management application, a starting point of a set of devices providing an optimal and consumable set of devices for the minimal set of resources and relationships further comprises:

identifying, by the computer system, for the first management application, the starting point of the set of devices comprising a plurality of servers managed by the first management application and the second management application, wherein the first management application is a network management application for primarily managing a network infrastructure within the computing environment and wherein the second management application is a server management application for primarily managing a server infrastructure within the computing environment comprising the plurality of servers.

6. The method according to claim 3, wherein identifying, by the computer system, for the first management application, a starting point of a set of devices providing an optimal and consumable set of devices for the minimal set of resources and relationships further comprises:

identifying, by the computer system, for the first management application, the starting point of the set of devices by identifying at least one network device managed by the first management application and each connected to a configured number of other devices within the computing environment, wherein the configured number is set to two connections, wherein at least one other network device managed by the first management application is connected to the configured number of other devices within the computing environment, wherein the first management application is a network management application for primarily managing a network infrastructure within the computing environment comprising the plurality of network devices and wherein the second management application is a server management application for primarily managing a server infrastructure within the computing environment.

7. The method according to claim 1, wherein identifying, by the computer system, for the first management application, only a minimal set of resources and relationships within the resource and relationship model providing at least one optimal linkage point between the first management application and the second management application further comprises:

identifying, by the computer system, for the first management application, only the minimal set of resources and relationships within the resource and relationship model by traversing the resource and relationship model from a first set of resources known by both the first management application and the second management application toward discipline specific resources of the discipline primarily managed by the first management application.

8. The method according to claim 1, wherein outputting, by the computer system, the minimal set of resources and relationships to the second management application further comprises:

outputting, by the computer system, the minimal set of resources and relationships in a file accessible to the second management application, wherein the file specifies only a selection of servers and network devices necessary for the second management application to link to the first management application as to the at least one common resource from among a plurality of servers and network devices topologically located between the first management application and the second management application.

9. A system for relating a first management application and an adjacent management application both managing at least one common resource in a computing environment, comprising:

a memory;

a processor coupled to the memory;

a linkage controller operative, on the processor, to analyze, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships by identifying, for the first management application comprising a network management application, the at least one common resource comprising at least one virtualized network switch operating at a layer of the computing environment also known by the second management application, comprising a server management application, in a second resource and relationship model of a second selection of resources and relationships managed by the second management application from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure;

the linkage controller operative to identify, for the first management application, only a minimal set of resources and relationships within the resource and relationship model providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application; and the linkage controller operative to output the minimal set of resources and relationships to the second management application, such that the server management application is informed, within the minimal set of resources and relationships, of at least one linkage resource within the first selection of resources and relationships that is not included in the second selection of resources and relationships managed by the second management application and is required to provide the at least one optimal linkage point between the network management application and the server management application through the at least one virtualized network switch.

10. The system according to claim 9, wherein the linkage controller operative to analyze, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships further comprises:

the linkage controller operative to identify, for the first management application comprising the server management application, the at least one common resource operating at the layer of the computing environment also known by the second management application comprising the application management application in the second resource and relationship model of the second selection of resources and relationships managed by the second management application from among the plurality of resources and relationships, wherein the server management application primarily manages the server infrastructure in the computing environment in a layer adjacent to an application infrastructure in the computing environment, wherein the application management application primarily manages the application infrastructure.

11. The system according to claim 9, wherein the linkage controller operative to identify, for the first management application, only a minimal set of resources and relationships within the resource and relationship model providing at least one optimal linkage point between the first management application and the second management application further comprises:

the linkage controller operative to identify, for the first management application, a starting point of a set of devices providing an optimal and consumable set of devices for the minimal set of resources and relationships; and the linkage controller operative to identify, for the first management application, a next layer of devices for the minimal set of resources and relationships, wherein the next layer of devices are connected to the set of devices and one hop away from the set of devices toward a type of device primarily managed by the first management application in a topology within the resource and relationship model.

12. The system according to claim 9, wherein the linkage controller operative to identify, for the first management application, only a minimal set of resources and relationships within the resource and relationship model providing at least one optimal linkage point between the first management application and the second management application further comprises:

the linkage controller operative to identify, for the first management application, only the minimal set of resources and relationships within the resource and relationship model by traversing the resource and relationship model from a first set of resources known by both the first management application and the second management application toward discipline specific resources of the discipline primarily managed by the first management application.

13. The system according to claim 9, wherein the linkage controller operative to output the minimal set of resources and relationships to the second management application further comprises:

the linkage controller operative to output the minimal set of resources and relationships in a file accessible to the second management application, wherein the file specifies only a selection of servers and network devices necessary for the second management application to link to the first management application as to the at least one common resource from among a plurality of servers and network devices topologically located between the first management application and the second management application.

14. A computer program product for relating a first management application and an adjacent management application both managing at least one common resource in a computing environment, said computer program product tangibly embodied in a non-transitory computer-readable storage medium and comprising computer executable instructions which cause a computer to:

analyze, for a first management application managing at least one common resource with a second management application adjacent to the first management application within a computing environment comprising a plurality of resources and relationships, a resource and relationship model known by the first management application of a selection of resources and relationships managed by the first management application from among the plurality of resources and relationships by identifying, for the first management application comprising a network management application, the at least one common resource comprising at least one virtualized network switch operating at a layer of the computing environment also known by the second management application, comprising a server management application, in a second resource and relationship model of a second selection of resources and relationships managed by the second management application from among the plurality of resources and relationships, wherein only a first portion of the first selection of resources and relationships is the same as a second portion of the second selection of resources and relationships from among the plurality of resources and relationships in a computing environment, wherein the network management application primarily manages a network infrastructure in the computing environment in a layer adjacent to a server infrastructure in the computing environment, wherein the server management application primarily manages the server infrastructure;

identify, for the first management application, only a minimal set of resources and relationships within the resource and relationship model providing at least one optimal linkage point between the first management application and the second management application as to the at least one common resource by identifying only the minimal set of resources and relationships within the first selection of resources and relationships and the second selection of resources and relationships providing at least one optimal linkage point between the first management application within the first selection of resources and relationships and the second management application within the second selection of resources and relationships as to the at least one common resource, wherein the minimal set of resources and relationships does not include all the resources and relationships between the first management application and the second management application; and output the minimal set of resources and relationships to the second management application, such that the server management application is informed, within the minimal set of resources and relationships, of at least one linkage resource within the first selection of resources and relationships that is not included in the second selection of resources and relationships managed by the second management application and is required to provide the at least one optimal linkage point between the network management application and the server management application through the at least one virtualized network switch.

15. The computer program product according to claim 14, further comprising computer executable instructions which cause a computer to:

identify, for the first management application comprising the server management application, the at least one common resource operating at the layer of the computing environment also known by the second management application comprising the application management application in the second resource and relationship model of the second selection of resources and relationships managed by the second management application from among the plurality of resources and relationships, wherein the server management application primarily manages the server infrastructure in the computing environment in a layer adjacent to an application infrastructure in the computing environment, wherein the application management application primarily manages the application infrastructure.

16. The computer program product according to claim 14, further comprising computer executable instructions which cause a computer to:

identify, for the first management application, a starting point of a set of devices providing an optimal and consumable set of devices for the minimal set of resources and relationships; and identify, for the first management application, a next layer of devices for the minimal set of resources and relationships, wherein the next layer of devices are connected to the set of devices and one hop away from the set of devices toward a type of device primarily managed by the first management application in a topology within the resource and relationship model.

17. The computer program product according to claim 14, further comprising computer executable instructions which cause a computer to:

identify, for the first management application, only the minimal set of resources and relationships within the resource and relationship model by traversing the resource and relationship model from a first set of resources known by both the first management application and the second management application toward discipline specific resources of the discipline primarily managed by the first management application.

18. The computer program product according to claim 14, further comprising computer executable instructions which cause a computer to:

output the minimal set of resources and relationships in a file accessible to the second management application, wherein the file specifies only a selection of servers and network devices necessary for the second management application to link to the first management application as to the at least one common resource from among a plurality of servers and network devices topologically located between the first management application and the second management application.

* * * * *